(12) United States Patent
Ebihara et al.

(10) Patent No.: US 8,773,580 B2
(45) Date of Patent: Jul. 8, 2014

(54) SOLID-STATE IMAGE PICKUP DEVICE AND CAMERA SYSTEM

(75) Inventors: Hiroaki Ebihara, Kanagawa (JP); Go Asayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 145 days.

(21) Appl. No.: 13/592,834

(22) Filed: Aug. 23, 2012

(65) Prior Publication Data

US 2013/0063637 A1 Mar. 14, 2013

(30) Foreign Application Priority Data

Sep. 12, 2011 (JP) ................................. 2011-198706

(51) Int. Cl.
*H04N 5/225* (2006.01)
*H04N 5/217* (2011.01)
*H04N 3/14* (2006.01)
*H04N 5/335* (2011.01)

(52) U.S. Cl.
USPC ........... 348/372; 348/241; 348/301; 348/300; 348/302

(58) Field of Classification Search
CPC ..... H04N 5/3575; H04N 5/363; H04N 5/374; H04N 5/2176; H04N 5/23241; H04N 5/2351; H01L 27/14609
USPC .................. 348/294–324, 372, 607–324, 241
See application file for complete search history.

(56) References Cited

U.S. PATENT DOCUMENTS

| | | | | |
|---|---|---|---|---|
| 5,539,457 A * | 7/1996 | Tsunai | ........................... | 348/241 |
| 5,982,426 A * | 11/1999 | Kimura | ........................... | 348/241 |
| 7,906,752 B2 * | 3/2011 | Fukuoka et al. | ........... | 250/208.1 |
| 8,300,142 B2 * | 10/2012 | Konno | ........................... | 348/372 |
| 2006/0170795 A1 * | 8/2006 | Higuchi et al. | ............... | 348/241 |
| 2008/0062286 A1 * | 3/2008 | Beck | ........................... | 348/241 |
| 2008/0143855 A1 * | 6/2008 | Hussey et al. | ................ | 348/241 |
| 2008/0239106 A1 * | 10/2008 | Sano | ............................ | 348/241 |
| 2009/0027518 A1 * | 1/2009 | Kita | ........................ | 348/231.99 |
| 2009/0166515 A1 * | 7/2009 | Boemler | .................. | 250/208.1 |
| 2009/0273691 A1 * | 11/2009 | Mo et al. | ....................... | 348/246 |
| 2010/0007775 A1 * | 1/2010 | Wang et al. | ................... | 348/241 |
| 2010/0053396 A1 * | 3/2010 | Okita et al. | ................... | 348/301 |
| 2010/0149385 A1 * | 6/2010 | Tay | .............................. | 348/241 |
| 2010/0238328 A1 * | 9/2010 | Pillman et al. | ............... | 348/241 |
| 2011/0134286 A1 * | 6/2011 | Inoue et al. | ................... | 348/241 |
| 2011/0221935 A1 * | 9/2011 | Kameshima | .................. | 348/241 |

FOREIGN PATENT DOCUMENTS

JP     2008-283501     11/2008

* cited by examiner

*Primary Examiner* — Chia-Wei A Chen
(74) *Attorney, Agent, or Firm* — Oblon, Spivak, McClelland, Maier & Neustadt, L.L.P.

(57) ABSTRACT

A solid-state image pickup device includes a pixel array unit that includes photoelectric conversion elements and in which a plurality of pixels are arranged in rows and columns that output, as pixel signals, electrical signals obtained by photoelectric conversion performed by amplifier elements to which pixel power supply voltage is supplied and that drive signal lines, a pixel power supply unit that generates the pixel power supply voltage from power supply voltage, the pixel power supply voltage being lower than the power supply voltage, and that supplies the pixel power supply voltage to the amplifier elements in the plurality of pixels, and a pixel signal read unit that reads pixel signals from the plurality of pixels.

12 Claims, 15 Drawing Sheets

BAYER PATTERN

SOLID-STATE IMAGE PICKUP DEVICE AND CAMERA SYSTEM

BACKGROUND

The present disclosure relates to a solid-state image pickup device represented by a complimentary metal-oxide-semiconductor (CMOS) image sensor and a camera system.

An output circuit of a charge-coupled device (CCD) as a solid-state image pickup device (image sensor) is typically a one-channel (ch) output for which a floating diffusion (FD) amplifier including an FD layer is used.

On the other hand, a CMOS image sensor includes an FD amplifier for each pixel therein, and the output thereof is typically of a column-parallel output type, in which a certain row is selected in a pixel array and read in a column direction at the same time.

This is because it is difficult to obtain a sufficient driving capability with the FD amplifier provided within a pixel and therefore the data rate is to be decreased, which can be advantageously realized by parallel processing.

Such a CMOS image sensor is widely used in an image pickup apparatus such as a digital camera, a camcorder, a monitoring camera, or an on-vehicle camera as an image pickup device.

FIG. 1 is a diagram illustrating an example of the general configuration of a CMOS image sensor in which pixels are arranged in a two-dimensional array.

A CMOS image sensor 10 illustrated in FIG. 1 includes a pixel array unit 11, a row selection circuit 12, and a read circuit (column processing circuit: AFE) 13.

In the pixel array unit 11, pixel circuits are arranged in a matrix having M rows and N columns.

Power supply voltage VDD is directly supplied to the pixel array unit 11.

The row selection circuit 12 controls the operation of pixels arranged in an arbitrary row in the pixel array unit 11. The row selection circuit 12 controls the pixels through control lines LSEL, LRST, and LTRG.

The read circuit 13 receives data regarding the row of pixels subjected to the read control by the row selection circuit 12 through a signal output line LSGN, and transfers the data to a signal processing circuit in a later stage.

The read circuit 13 includes a correlated double sampling (CDS) circuit and an analog-to-digital converter (ADC).

FIG. 2 is a diagram illustrating an example of the pixel circuit in the CMOS image sensor including four transistors.

A pixel circuit 20 includes, for example, a photoelectric conversion element (hereinafter also referred to simply as a PD) 21 including a photodiode (PD). The pixel circuit 20 includes, for this single photoelectric conversion element 21, four transistors, namely a transfer transistor 22, a reset transistor 23, an amplifier transistor 24, and a selection transistor 25, as active elements.

The photoelectric conversion element 21 converts incident light into a certain amount of electric charge (here, electrons) in accordance with the amount of the incident light.

The transfer transistor 22 is connected between the photoelectric conversion element 21 and a floating diffusion FD (hereinafter also referred to simply as an FD), and a transfer signal (driving signal) TRG is supplied to the gate (transfer gate) of the transfer transistor 22 through the transfer control line LTRG.

Thus, the electrons that have been subjected to the photoelectric conversion by the photoelectric conversion element 21 are transferred to the floating diffusion FD.

The reset transistor 23 is connected between a power supply line LVDD and the floating diffusion FD, and a reset signal RST is supplied to the gate of the reset transistor 23 through the reset control line LRST.

Thus, the potential of the floating diffusion FD is reset to the potential of the power supply line LVDD.

The gate of the amplifier transistor 24 is connected to the floating diffusion FD. The amplifier transistor 24 is connected to a signal line 26 (LSGN illustrated in FIG. 1) through the selection transistor 25 to configure a constant-current source and a source follower outside the pixel.

An address signal (selection signal) SEL is supplied to the gate of the selection transistor 25 through the selection control line LSEL, and the selection transistor 25 is turned on.

When the selection transistor 25 has been turned on, the amplifier transistor 24 amplifies the potential of the floating diffusion FD and outputs voltage according to the potential to the signal line 26. The voltage output from each pixel through the signal line 26 is output to the read circuit.

In a reset operation of each pixel, electric charge accumulated in the photoelectric conversion element 21 is transferred to the floating diffusion FD and then discharged by turning on the transfer transistor 22.

At this time, the reset transistor 23 is turned on in advance and discharges the electric charge to the power supply side, so that the floating diffusion FD can receive the electric charge in the photoelectric conversion element 21. Alternatively, the reset transistor 23 is turned on while the transfer transistor 22 is turned on, in order to directly discharge the electric charge to a power supply.

This series of operations will be referred to simply as the "pixel reset operation" or the "shutter operation".

On the other hand, in a read operation, first, the reset transistor 23 is turned on to reset the floating diffusion FD, and the selection transistor 25 is turned on in this state to output the electric charge to the output signal line 26. This is called "P-phase output".

Next, the transfer transistor 22 is turned on to transfer the electric charge accumulated in the photoelectric conversion element 21 to the floating diffusion FD, and the output of the floating diffusion FD is output to the output signal line 26. This is called "D-phase output".

A difference between the D-phase output and the P-phase output is obtained outside the pixel circuit, and reset noise of the floating diffusion FD is cancelled to obtain an image signal.

This series of operations will be referred to simply as the "pixel read operation".

The transfer control line LTRG, the reset control line LRST, and the selection control line LSEL are selectively driven by the row selection circuit 12.

As the configuration of the pixel circuit, a three-transistor configuration (3Tr type) pixel circuit, a five-transistor configuration (5Tr type) pixel circuit, and the like may be adopted instead of the four-transistor configuration (4Tr type) pixel circuit.

The 3Tr-type pixel circuit does not include a transfer transistor that controls the movement of electric charge from the photoelectric conversion element (PD) 21 to the floating diffusion FD in accordance with the potential of the transfer control line LTRG.

FIG. 3 is a diagram illustrating another example of the pixel circuit in the CMOS image sensor including four transistors.

In a pixel circuit 20A illustrated in FIG. 3, the reset transistor is connected to a power supply line LVREF different from the power supply line LVDD.

That is, in the pixel circuit 20A, the reset transistor 23 is connected between the power supply line LVREF and the floating diffusion FD, and the reset signal RST is supplied to the gate of the reset transistor 23 through the reset control line LRST.

Thus, the potential of the floating diffusion FD is reset to the potential of the power supply line LVREF.

In Japanese Unexamined Patent Application Publication No. 2008-283501, a technique for driving a pixel circuit including supply of power supply voltage is described.

SUMMARY

However, in the above-described technique, the power supply voltage VDD is basically supplied to the pixel array unit 11 directly.

As a result, when noise has been superimposed upon a power supply of a pixel, the noise can be mixed into a read signal output from the pixel, which is disadvantageous.

In addition, when the power supply voltage is high, high voltage is applied to transistors in the pixel, thereby deteriorating the characteristics over time, which is also disadvantageous. In particular, when negative voltage is supplied to the gate of a transfer transistor while the transfer transistor is off, the characteristics tend to deteriorate.

It is desirable to provide a solid-state image pickup device and a camera system that can prevent noise from mixing into a read signal of a pixel and to suppress deterioration of the characteristics of the transistors that form the pixel over time.

A solid-state image pickup device according to a first embodiment of the present disclosure includes a pixel array unit that includes photoelectric conversion elements and in which a plurality of pixels are arranged in rows and columns that output, as pixel signals, electrical signals obtained by photoelectric conversion performed by amplifier elements to which pixel power supply voltage is supplied and that drive signal lines, a pixel power supply unit that generates the pixel power supply voltage from power supply voltage, the pixel power supply voltage being lower than the power supply voltage, and that supplies the pixel power supply voltage to the amplifier element in each of the pixels, and a pixel signal read unit that reads pixel signals from the plurality of pixels. The pixel power supply unit includes a pixel power supply circuit that generates the pixel power supply voltage having a target voltage while attenuating the power supply voltage such that at least noise superimposed upon the power supply voltage is not transmitted to the pixel signals to be output.

A camera system according to a second embodiment of the present disclosure includes a solid-state image pickup device, and an optical system that forms an image on the solid-state image pickup device. The solid-state image pickup device includes a pixel array unit that includes photoelectric conversion elements and in which a plurality of pixels are arranged in rows and columns that output, as pixel signals, electrical signals obtained by photoelectric conversion performed by amplifier elements to which pixel power supply voltage is supplied and that drive signal lines, pixel power supply unit that generates the pixel power supply voltage from power supply voltage, the pixel power supply voltage being lower than the power supply voltage, and that supplies the pixel power supply voltage to the amplifier element in each of the pixels, and a pixel signal read unit that reads pixel signals from the plurality of pixels. The pixel power supply unit includes a pixel power supply circuit that generates the pixel power supply voltage having a target voltage while attenuating the power supply voltage such that at least noise superimposed upon the power supply voltage is not transmitted to the pixel signals to be output.

According to the present technology, it is possible to prevent noise from mixing into a read signal of a pixel and to suppress deterioration of the characteristics of transistors that form the pixel over time.

DETAILED DESCRIPTION OF EMBODIMENTS

Embodiments of the present technology will be described hereinafter with reference to the drawings.

Figure 1:
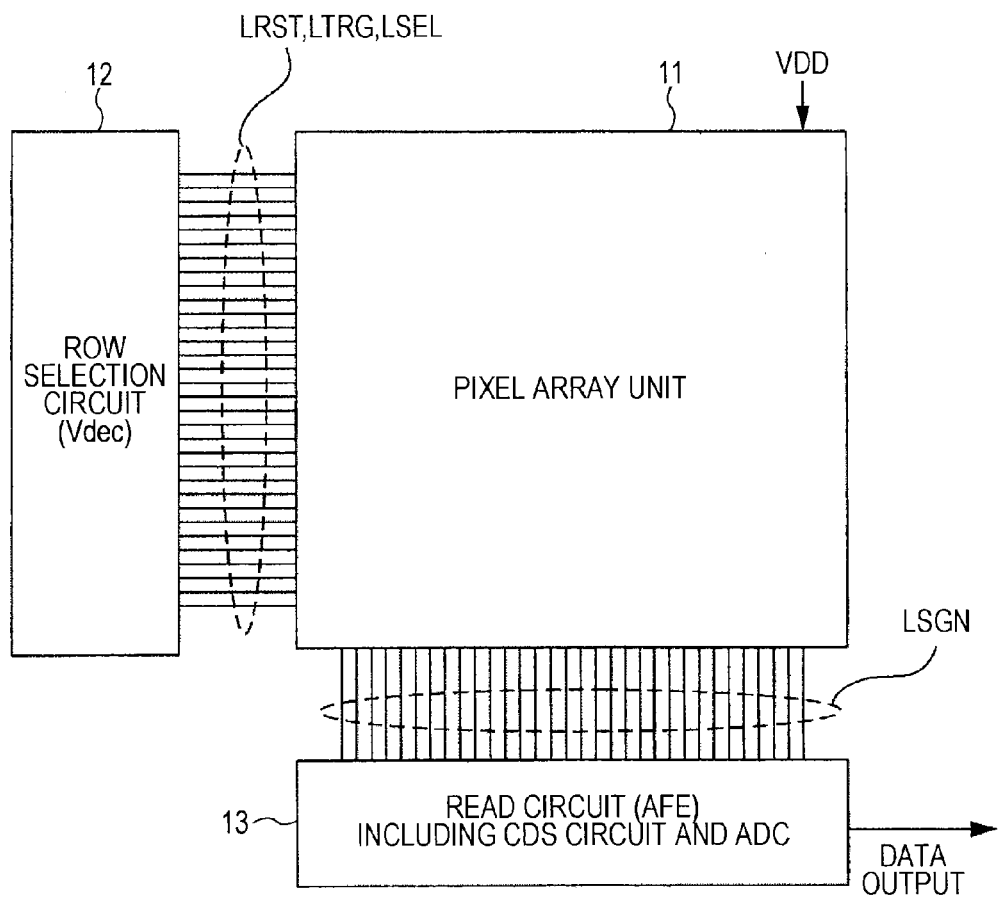
FIG. 1 is a diagram illustrating an example of the general configuration of a CMOS image sensor (solid-state image pickup device) in which pixels are arranged in a two-dimensional array.
Figure 2:
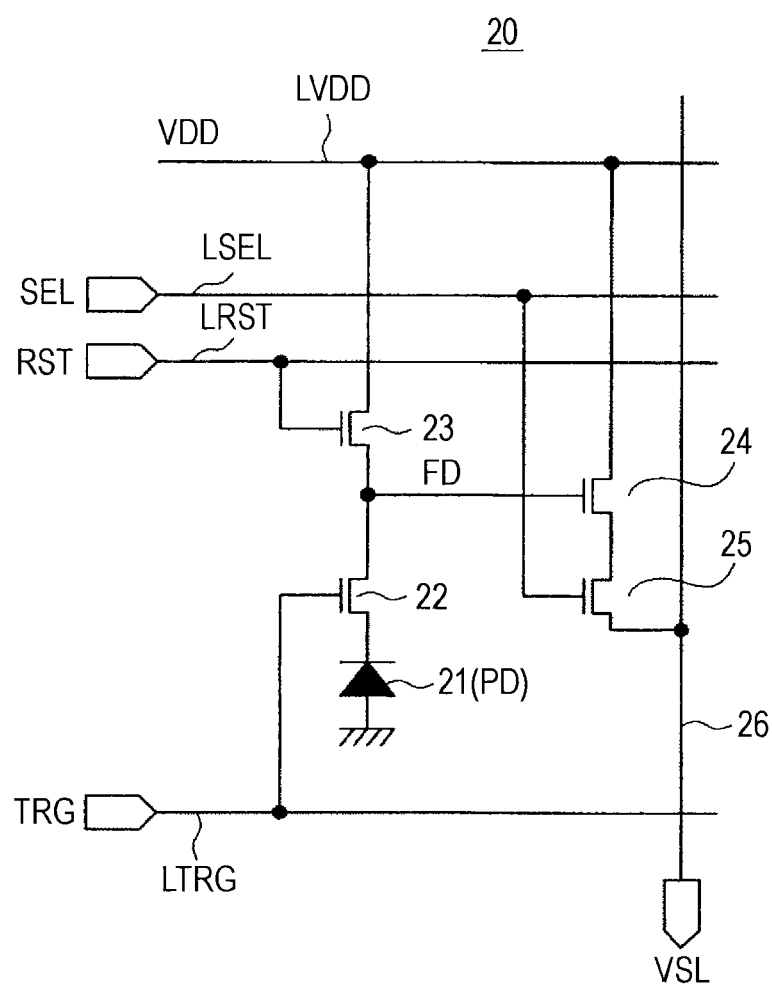
FIG. 2 is a diagram illustrating an example of a pixel circuit in a CMOS image sensor including four transistors.
Figure 3:
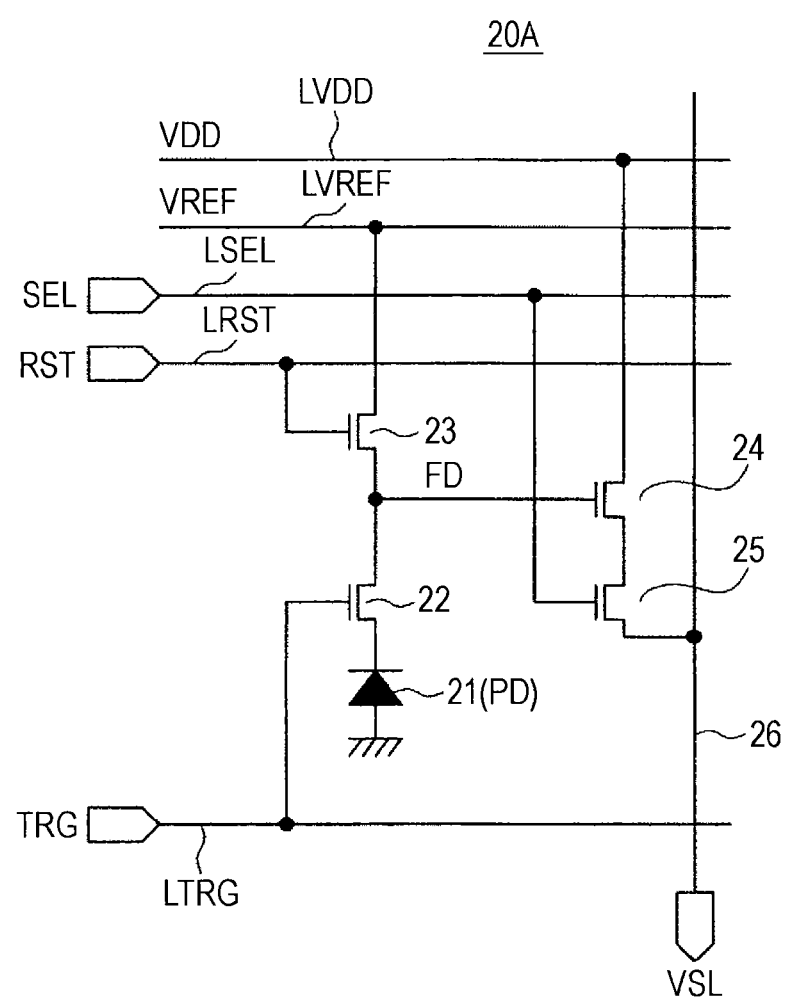
FIG. 3 is a diagram illustrating another example of the pixel circuit in the CMOS image sensor including the four transistors.
Figure 4:
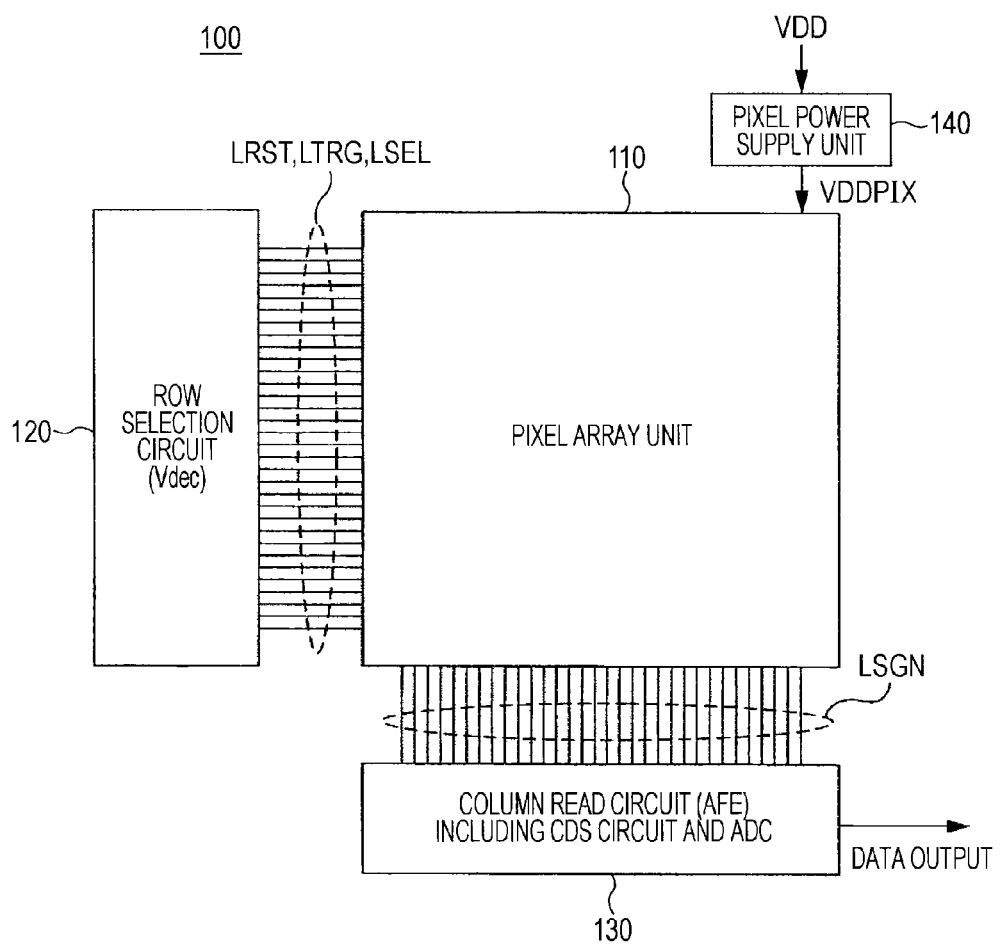
FIG. 4 is a diagram illustrating an example of the configuration of a CMOS image sensor (solid-state image pickup device) according to an embodiment of the present technology.

The following items will be described in this order.
1. Schematic Configuration of Entirety of Solid-State Image Pickup Device
2. First Example of Configurations of Pixel Power Supply Unit and Pixel Array Unit
3. Second Example of Configurations of Pixel Power Supply Unit and Pixel Array Unit
4. Specific Example of Configuration of Pixel Power Supply Circuit
5. Example of Configuration of Column-Parallel ADC-Mounted Solid-State Image Pickup Device (CMOS Image Sensor)
6. Example of Configuration of Camera System
1. Schematic Configuration of Entirety of Solid-State Image Pickup Device FIG. 4 is a diagram illustrating an example of the configuration of a CMOS image sensor (solid-state image pickup device) according to an embodiment.

A CMOS image sensor 100 includes a pixel array unit 110, a row selection circuit (Vdec) 120, a column read circuit (AFE) 130, and a pixel power supply unit 140.

A pixel signal read unit includes the row selection circuit 120 and the column read circuit 130.

In the pixel array unit 110, a plurality of pixel circuits 110A are arranged in two dimensions, that is, in M rows and N columns (in a matrix).

Figure 5:
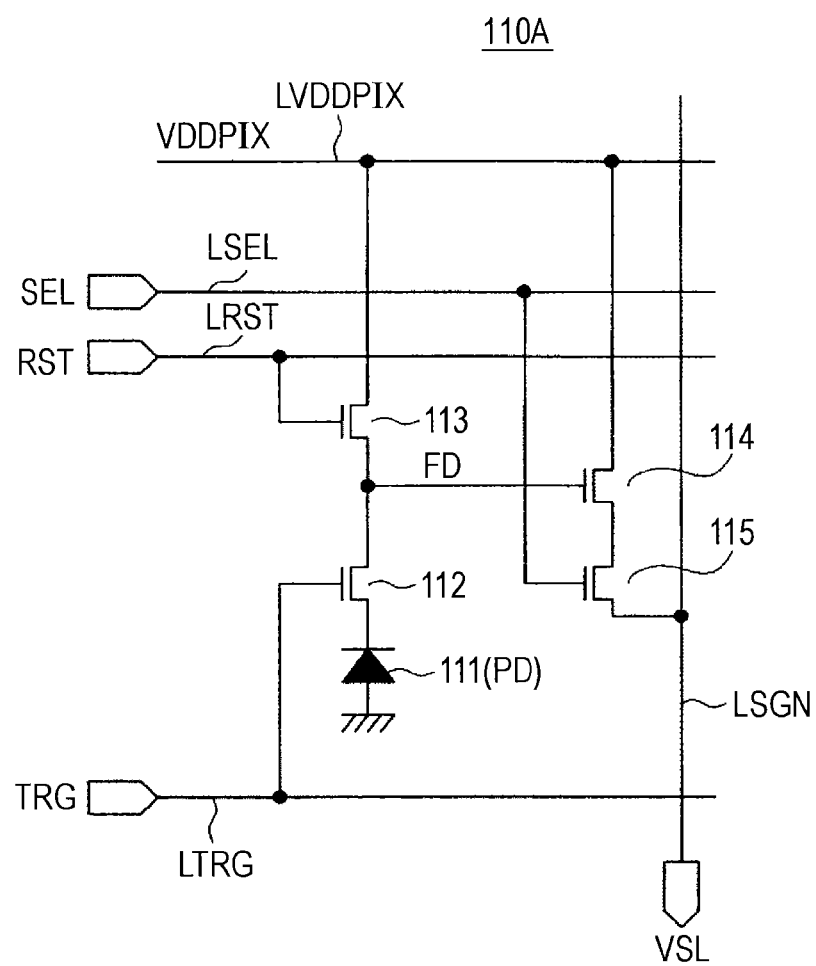
FIG. 5 is a diagram illustrating an example of a pixel in a CMOS image sensor according to the embodiment including four transistors.

FIG. 5 is a diagram illustrating an example of a pixel in a CMOS image sensor according to this embodiment including four transistors.

The pixel circuit 110A includes, for example, a photoelectric conversion element (hereinafter also referred to simply as the "PD") 111 including a photodiode (PD).

The pixel circuit 110A includes, as active elements, four transistors, namely, a transfer transistor 112, a reset transistor 113, an amplifier transistor 114, and a selection transistor 115, for this single photoelectric conversion element 111.

The photoelectric conversion element 111 converts incident light into a certain amount of electric charge (here, electrons) in accordance with the amount of the incident light.

The transfer transistor 112 as a transfer element is connected between the photoelectric conversion element 111 and a floating diffusion FD as an input node, and a transfer signal TRG, which is a control signal, is supplied to the gate (transfer gate) of the transfer transistor 112 through a transfer control line LTRG.

Thus, the transfer transistor 112 transfers the electrons obtained as a result of the photoelectric conversion by the photoelectric conversion element 111 to the floating diffusion FD.

The reset transistor 113 is connected between a power supply line LVDDPIX to which pixel power supply voltage VDDPIX is supplied and the floating diffusion FD, and a reset signal RST, which is a control signal, is supplied to the gate of the reset transistor 113 through a reset control line LRST.

Thus, the reset transistor 113 as a reset element resets the potential of the floating diffusion FD to the potential of the power supply line LVDDPIX.

The gate of the amplifier transistor 114 as an amplifier element is connected to the floating diffusion FD. That is, the floating diffusion FD functions as an input node of the amplifier transistor 114 as an amplifier element.

The amplifier transistor 114 and the selection transistor 115 are connected between the power supply line LVDDPIX to which the pixel power supply voltage VDDPIX is supplied and a signal line LSGN in series with each other.

Thus, the amplifier transistor 114 is connected to the signal line LSGN through the selection transistor 115 to configure a constant-current source and a source follower outside a pixel unit.

A selection signal SEL, which is a control signal according to an address signal, is supplied to the gate of the selection transistor 115 through a selection control line LSEL, and the selection transistor 115 is turned on.

When the selection transistor 115 has been turned on, the amplifier transistor 114 amplifies the potential of the floating diffusion FD and outputs voltage according to the amplified potential to the signal line LSGN. The voltage output from each pixel through the corresponding signal line LSGN is output to the column read circuit 130.

Because, for example, the gates of the transfer transistor 112, the reset transistor 113, and the selection transistor 115 are connected in units of rows, these operations are performed for pixels in the same row at the same time.

The reset control line LRST, the transfer control line LTRG, and the selection control line LSEL provided in the pixel array unit 110 are provided for each row as a unit in pixel arrangement.

The numbers of the control lines LRST, LTRG, and LSEL provided are M.

The reset control lines LRST, the transfer control lines LTRG, and the selection control lines LSEL are driven by the row selection circuit 120.

The row selection circuit 120 controls the operation of pixels arranged in an arbitrary row in the pixel array unit 110. The row selection circuit 120 controls the pixels through the control lines LSEL, LRST, and LTRG.

The row selection circuit 120 performs image driving control by, for example, switching an exposure method between a rolling shutter method, in which exposure is performed for each row, and a global shutter method, in which exposure is performed for all the pixels at the same time, in accordance with a shutter mode switching signal.

The column read circuit 130 receives, through the signal output line LSGN, data regarding a row of pixels on which read control has been performed by the row selection circuit 120, and transfers the data to a signal processing circuit in a later stage.

The column read circuit 130 includes a CDS circuit and an ADC.

The pixel power supply unit 140 according to this embodiment includes a pixel power supply circuit and generates the pixel power supply voltage VDDPIX from supplied power supply voltage VDD, and then supplies the generated pixel power supply voltage VDDPIX to the pixel circuits 110A through the power supply line LVDDPIX.

The pixel power supply unit 140 generates the pixel power supply voltage VDDPIX having an appropriate value, so that noise is not transmitted to the pixel read signal even if the noise has been superimposed upon the power supply voltage VDD and the transistors included in the pixels do not deteriorate over time, and then supplies the pixel power supply voltage VDDPIX to the pixel circuits 110A.

2. First Example of Configurations of Pixel Power Supply Unit and Pixel Array Unit FIG. 6 is a diagram illustrating a first example of the configurations of the pixel power supply unit and the pixel array unit according to the embodiment.

Figure 6:
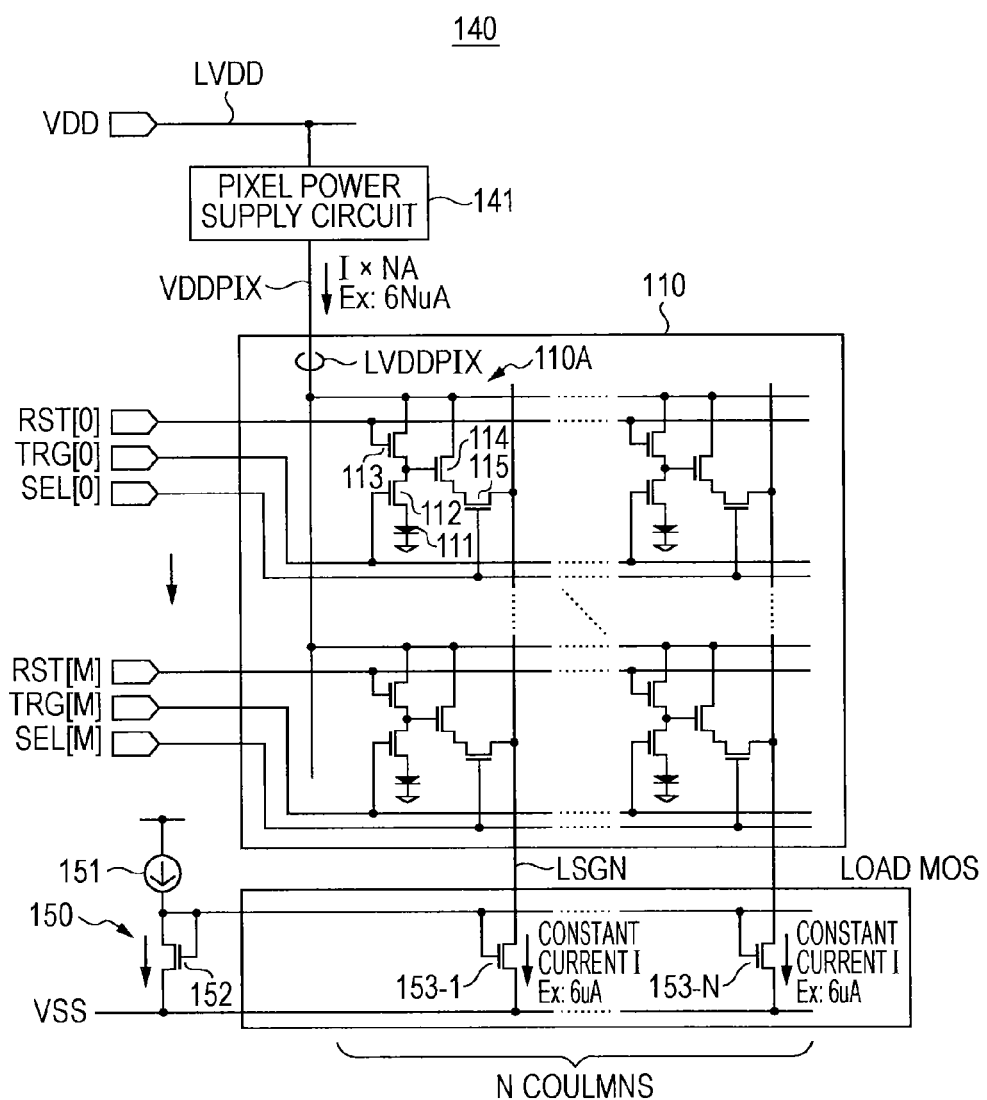
FIG. 6 is a diagram illustrating a first example of the configurations of a pixel power supply unit and a pixel array unit according to the embodiment.

The pixel power supply unit 140 illustrated in FIG. 6 includes a pixel power supply circuit 141.

As described above, the pixel power supply circuit 141 generates the pixel power supply voltage VDDPIX from the supplied power supply voltage VDD and supplies the generated pixel power supply voltage VDDPIX to the pixel circuits 110A through the power supply line LVDDPIX. The power supply line LVDDPIX corresponds to a first power supply line.

The power supply line LVDDPIX is connected to power supply-side terminals (drains) of the amplifier transistor 114 and the reset transistor 113 of each pixel circuit 110A.

Therefore, the pixel power supply circuit 141 supplies the generated pixel power supply voltage VDDPIX to the power supply-side terminals (drains) of the amplifier transistor 114 and the reset transistor 113 of each pixel circuit 110A through the power supply line LVDDPIX.

As will be described later, the pixel power supply circuit 141 is configured to supply the power supply voltage to the pixels through low-dropout (LDO) regulators and metal-oxide-semiconductor field-effect transistors (MOSFETs), so that noise is attenuated and not transmitted to the pixels.

By decreasing the power supply voltage supplied to the pixels using the LDO regulators and the MOSFETs, the pixel power supply circuit 141 weakens electric fields generated in the transistors of the pixels, thereby suppressing (reducing) deterioration of the characteristics.

It is to be noted that the LDO regulators are linear voltage regulators that operate even when input voltage barely exceeds desired output voltage.

In addition, in FIG. 6, a source follower circuit current source circuit 150 for the pixels is illustrated.

The source follower circuit 150 includes a constant-current source 151 connected to a power supply, a current mirror transistor 152 connected to the constant-current source 151, and transistors 153-1 to 153-N as loads connected to vertical signal lines LSGN-1 to LSGN-N, respectively.

The transistors 152 and 153-1 to 153-N are, for example, formed by n-channel MOSFETs.

The power supply line LVDDPIX to which the pixel power supply voltage VDDPIX is supplied and that functions as the power supply of the pixels is used for a source follower of the pixels, and, in the example illustrated in FIGS. 5 and 6, the drain of the amplifier transistor 114 (and that of the reset transistor 113) is connected to the power supply line LVDDPIX.

The power supply used for the source follower of the pixels is supposed to output large current when signals are read from the pixels to the vertical signal lines LSGN. For example, if a current of 6 μA is output for each column when the number of columns in the pixel array is 3,000, a current of 18 mA is to be supplied.

Therefore, the power supply used for the source follower of the pixels is supposed to have a sufficient current supply capability, and resistance viewed from the VDD side is supposed to be high at frequencies higher than the bandwidth of CDS.

3. Second Example of Configurations of Pixel Power Supply Unit and Pixel Array Unit FIG. 7 is a diagram illustrating a second example of the configurations of the pixel power supply unit and the pixel array unit according to the embodiment.

Figure 7:
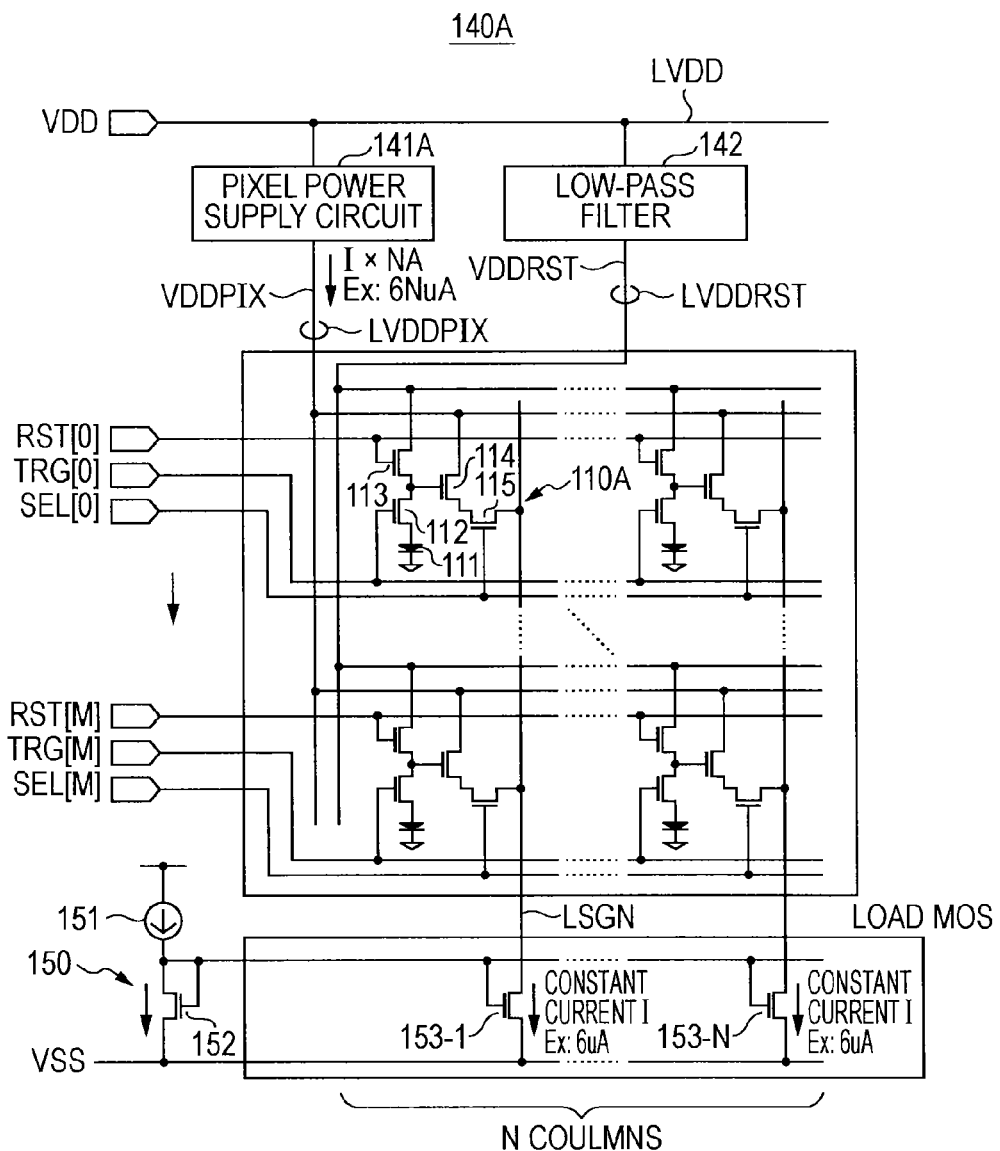
FIG. 7 is a diagram illustrating a second example of the configurations of the pixel power supply unit and the pixel array unit according to the embodiment.

A pixel power supply unit 140A illustrated in FIG. 7 includes a low-pass filter (LPF) 142 in addition to a pixel power supply circuit 141A.

As described above, the pixel power supply circuit 141A generates the pixel power supply voltage VDDPIX from the supplied power supply voltage VDD and supplies the generated pixel power supply voltage VDDPIX to the pixel circuits 110A through the power supply line LVDDPIX.

In FIG. 7, the power supply line LVDDPIX is connected to a power supply-side terminal (drain) of the amplifier transistor 114 of each pixel circuit 110A.

Therefore, the pixel power supply circuit 141A supplies the generated pixel power supply voltage VDDPIX to the power supply-side terminal (drain) of the amplifier transistor 114 of each pixel circuit 110A through the power supply line LVDDPIX.

The low-pass filter 142 extracts low-frequency components of the power supply voltage VDD and outputs extracted pixel reset power supply voltage VDDRST to a power supply line LVDDRST. The power supply line LVDDRST corresponds to a second power supply line.

In FIG. 7, the power supply line LVDDRST is connected to a power supply-side terminal (drain) of the reset transistor 113 of each pixel circuit 110A.

Therefore, the low-pass filter 142 supplies the extracted reset power supply voltage VDDRST to the power supply-side terminal (drain) of the reset transistor 113 of each pixel circuit 110A through the power supply line LVDDRST.

The reason why the two power supply lines are used in the pixel power supply unit 140A is as will be described later.

The power supply line LVDDPIX to which the pixel power supply voltage VDDPIX is supplied and that functions as the power supply of the pixels is used for a source follower of each pixel, and, in the example illustrated in FIG. 7, the drain of the amplifier transistor 114 is connected to the power supply line LVDDPIX.

The power supply line LVDDRST to which the pixel reset power supply voltage VDDRST is supplied and that functions as a pixel reset power supply is connected to the drain of the reset transistor 113.

As described above, the power supply used for the source follower of the pixels is supposed to output large current when signals are read from the pixels to the vertical signal lines LSGN. For example, if a current of 6 μA is output for each column when the number of columns in the pixel array is 3,000, a current of 18 mA is to be supplied.

Therefore, the power supply used for the source follower of the pixels is supposed to have a sufficient current supply capability, and resistance viewed from the VDD side is supposed to be high at frequencies higher than the bandwidth of CDS.

On the other hand, the pixel reset power supply does not output large constant current. Therefore, current can be supplied through a simple low-pass filter (includes a resistor R, a capacitor C, a switched capacitor, and the like).

4. Specific Example of Configuration of Pixel Power Supply Circuit

Next, a specific example of the configuration of a pixel power supply circuit that forms the pixel power supply unit according to the embodiment.

In the following description, a pixel power supply circuit 200 is used.

4.1. First Example of Configuration of Pixel Power Supply Circuit

Figure 8:
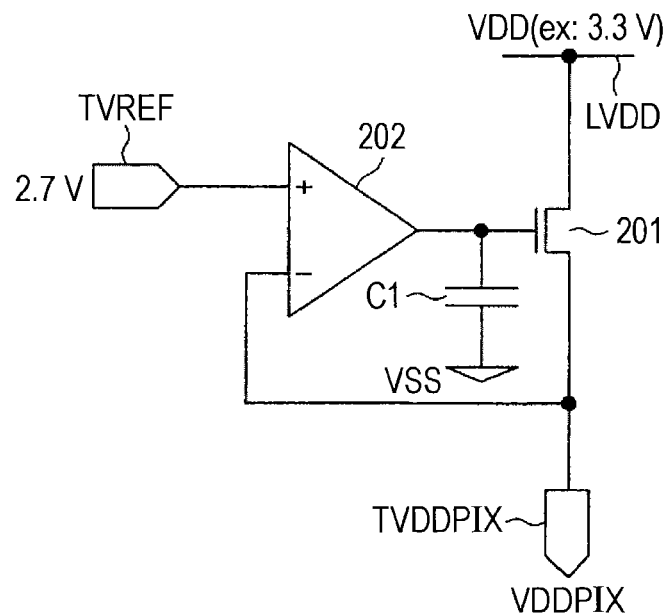
FIG. 8 is a circuit diagram illustrating a first example of the configuration of a pixel power supply circuit according to the embodiment.

FIG. 8 is a circuit diagram illustrating a first example of the configuration of the pixel power supply circuit according to the embodiment.

The pixel power supply circuit 200 illustrated in FIG. 8 includes a drop n-type metal-oxide-semiconductor (NMOS) transistor 201, an operational amplifier 202, a capacitor C1, a reference voltage supply terminal TVREF, and an output terminal TVDDPIX of the pixel power supply voltage VDDPIX.

The pixel power supply circuit 200 is formed as an LDO circuit including the drop NMOS transistor 201 and the operational amplifier 202.

As described above, the LDO circuit is a linear voltage regulator that operates even when input voltage barely exceeds desired output voltage.

The drain of the NMOS transistor 201 is connected to the power supply line LVDD to which the power supply voltage VDD is supplied, and the source of the NMOS transistor 201 is connected to the inverting input terminal (−) of the operational amplifier 202 and the output terminal TVDDPIX.

The gate of the NMOS transistor 201 is connected to the output of the operational amplifier 202, and the non-inverting input terminal (+) of the operational amplifier 202 is connected to the reference voltage supply terminal TVREF.

In addition, the capacitor C1 is connected between the gate of the NMOS transistor 201 and reference potential VSS.

In the pixel power supply circuit 200, the input power supply voltage VDD (for example, 3.3 V) is caused to drop by passing the input power supply voltage VDD through the NMOS transistor 201, and the output pixel power supply voltage (for example, 2.7 V) is output.

The pixel power supply circuit 200 compares the reference voltage (for example, 2.7 V) and the output voltage using the operational amplifier 202, and controls the on-resistance of the NMOS transistor 201 using an output signal of the operational amplifier 202 according to a result of the comparison, in order to keep the output voltage constant.

Thus, the pixel power supply circuit 200 illustrated in FIG. 8 is configured as an LDO regulator to which the NMOS transistor 201 is applied as a drop (pass device) transistor.

The pixel power supply circuit 200 is effective when the power supply voltage VDD is sufficiently higher (for example, higher by 0.5 V) than the target voltage (for example, 2.7 V) of the output pixel power supply voltage VDDPIX.

The pixel power supply circuit 200 can accurately match the value of the pixel power supply voltage VDDPIX and the target voltage.

According to the pixel power supply circuit 200, even if noise has been superimposed upon the power supply voltage VDD, low-frequency components of up to several MHz are hardly transmitted to the pixel power supply voltage VDDPIX.

In general, it is sufficient if the bandwidth of a read circuit (not illustrated) that executes analog-to-digital conversion on the voltage VSL of the vertical signal lines LSGN is about several MHz.

Even if noise at a frequency higher than the bandwidth is superimposed upon the pixel power supply, it is possible to cause the read circuit not to execute the analog-to-digital conversion on the noise.

In addition, in general, because a stabilizing capacitor is connected to the power supply of the sensor, it is unlikely that noise at a frequency higher than hundreds of MHz enters the sensor.

Noise at tens to hundreds of MHz, which can actually be superimposed upon the power supply voltage VDD, does not affect the output of the sensor.

4.2. Second Example of Configuration of Pixel Power Supply Circuit

Figure 9:
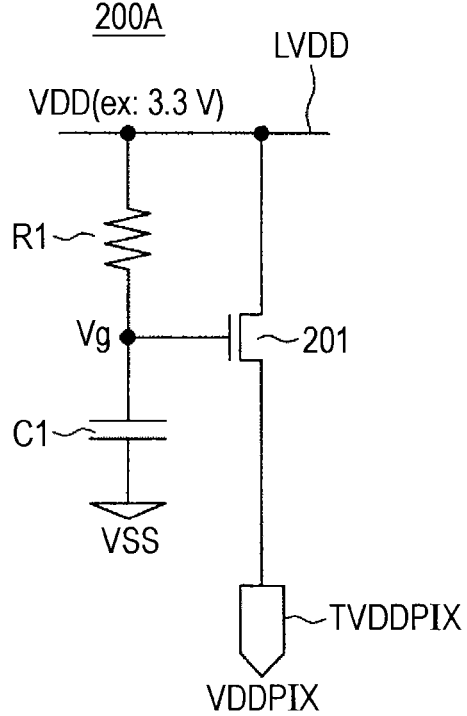
FIG. 9 is a circuit diagram illustrating a second example of the configuration of the pixel power supply circuit according to the embodiment.

FIG. 9 is a circuit diagram illustrating a second example of the configuration of the pixel power supply circuit according to this embodiment.

A pixel power supply circuit 200A illustrated in FIG. 9 does not have an LDO configuration. The gate of the NMOS transistor 201 is connected to the power supply line LVDD through a resistor element R1.

Therefore, the DC level of the gate voltage Vg of the NMOS transistor 201 is kept at the VDD level.

In addition, the capacitor C1 is connected between the NMOS transistor 201 and the reference potential VSS.

In the pixel power supply circuit 200A, if the gate-source voltage of the NMOS transistor 201 when current (I×N) A flows through the NMOS transistor 201 is denoted by Vgs, the pixel power supply voltage VDDPIX to be output to the power supply line LVDDPIX is represented by the following expression:

$$VDDPIX = VDD - Vgs$$

If the gate voltage Vg of the NMOS transistor 201 is constant, noise superimposed upon the power supply voltage VDD is hardly transmitted to the pixel power supply voltage VDDPIX.

The noise superimposed upon the power supply voltage VDD is transmitted to the gate of the NMOS transistor 201 through a low-pass filter including the resistor R1 and the capacitor C1.

Frequencies equal to or higher than the cutoff frequency $fc = 1/2\pi RC$ are attenuated by this low-pass filter at a rate of 20 dB/dec.

In general, a CMOS image sensor executes CDS during reading. In the CDS, the CMOS image sensor operates as a high-pass filter to obtain a difference between the signal level and the reset level.

When the cutoff frequency fc of the low-pass filter is set to be sufficiently lower than the bandwidth of the CDS, noise can be reduced by the CDS on the low-frequency side and by the low-pass filter on the high-frequency side.

For example, if the intervals TCDS of sampling are 5 μs and the cutoff frequency fc is 1 kHz (R=1 MΩ and C is 160 pF), noise transmitted from the power supply voltage VDD to the pixel power supply voltage VDDPIX can be lower than or equal to −20 dB (1/10) at all frequencies.

4.3. Third Example of Configuration of Pixel Power Supply Circuit

Figure 10:
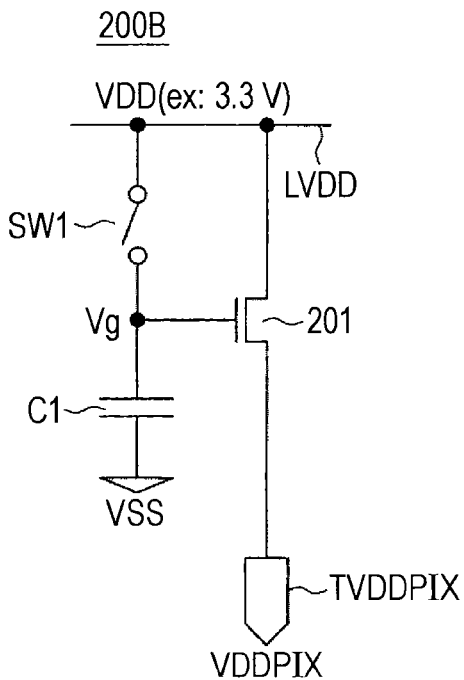
FIG. 10 is a circuit diagram illustrating a third example of the configuration of the pixel power supply circuit according to the embodiment.

FIG. 10 is a circuit diagram illustrating a third example of the configuration of the pixel power supply circuit according to this embodiment.

In a pixel power supply circuit 200B illustrated in FIG. 10, the gate of the NMOS transistor 201 is not connected to a resistor element but connected to the power supply line LVDD of the power supply voltage VDD through a switch SW1.

In the pixel power supply circuit 200B, the gate voltage Vg of the NMOS transistor 201 is sampled and held.

For example, when the column read circuit 130 includes an analog-to-digital converter, a control system that is not illustrated controls the switch SW1 such that the switch SW1 is open during the analog-to-digital conversion and closed during periods other than the analog-to-digital conversion.

Therefore, the gate voltage Vg of the NMOS transistor 201 is held by the holding operation during the analog-to-digital conversion and is constant.

With respect to the pixel power supply voltage VDDPIX to be output to the power supply line LVDDPIX, since the current (IxN) A flows through the NMOS transistor 201, the gate-source voltage Vgs of the NMOS transistor 201 is constant.

Therefore, the pixel power supply voltage VDDPIX is also kept constant.

If noise is superimposed upon the power supply, the value of the pixel power supply voltage VDDPIX changes each time the sample and hold is performed. However, in the case of the configuration of the sensor illustrated in FIG. 7, the noise is hardly transmitted to the read signals VSL output to the vertical signal lines LSGN.

4.4. Fourth Example of Configuration of Pixel Power Supply Circuit

Figure 11:
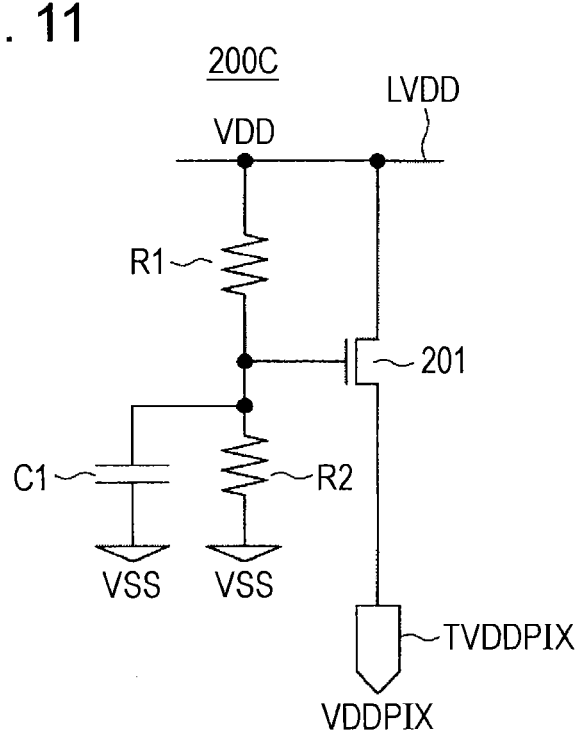
FIG. 11 is a circuit diagram illustrating a fourth example of the configuration of the pixel power supply circuit according to the embodiment.

FIG. 11 is a circuit diagram illustrating a fourth example of the configuration of the pixel power supply circuit according to this embodiment.

A pixel power supply circuit 200C illustrated in FIG. 11 includes, in addition to the configuration illustrated in FIG. 9, a resistor element R2 connected between the gate of the NMOS transistor 201 and the reference potential VSS, and is configured to divide the power supply voltage VDD using the resistor elements R1 and R2.

In the pixel power supply circuit 200C, when the value of the pixel power supply voltage VDDPIX is to be decreased, the power supply voltage VDD is divided using the resistors and the DC level of the gate voltage Vg of the NMOS transistor 201 is determined.

4.5. Fifth Example of Configuration of Pixel Power Supply Circuit

Figure 12:
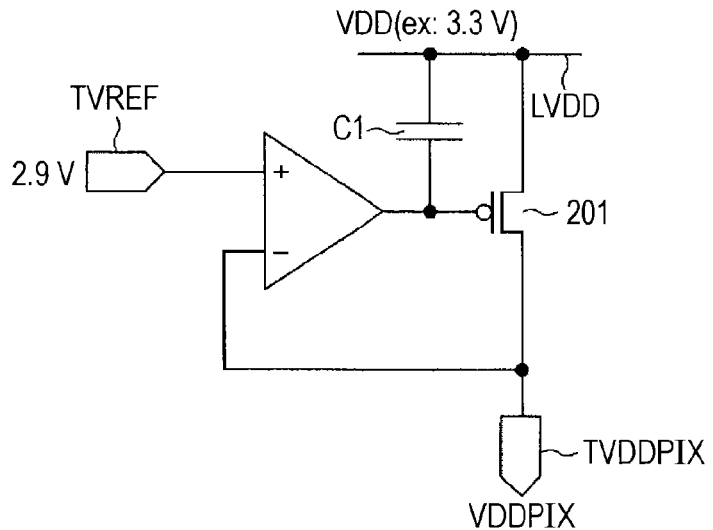
FIG. 12 is a circuit diagram illustrating a fifth example of the configuration of the pixel power supply circuit according to the embodiment.

FIG. 12 is a circuit diagram illustrating a fifth example of the configuration of the pixel power supply circuit according to this embodiment.

A pixel power supply circuit 200D illustrated in FIG. 12 corresponds to the LDO pixel power supply circuit 200 illustrated in FIG. 8, and a p-type metal-oxide-semiconductor (PMOS) transistor 203 is applied as a drop transistor instead of the NMOS transistor.

The source of the PMOS transistor 203 is connected to the power supply line LVDD, and the drain of the PMOS transistor 203 is connected to the inverting input terminal (−) of the operational amplifier 202 and the output terminal TVDDPIX.

Accordingly, the capacitor C1 is connected between the gate of the PMOS transistor 203 and the power supply line LVDD.

The reference voltage VREF in this example is 2.9 V.

In the pixel power supply circuit 200D, the target voltage of the pixel power supply voltage VDDPIX can be made higher than when the NMOS transistor is used.

However, the amount of noise transmitted from the power supply voltage VDD to the pixel power supply voltage VDDPIX tends to increase on the high frequency side.

4.6. Sixth Example of Configuration of Pixel Power Supply Circuit

Figure 13:
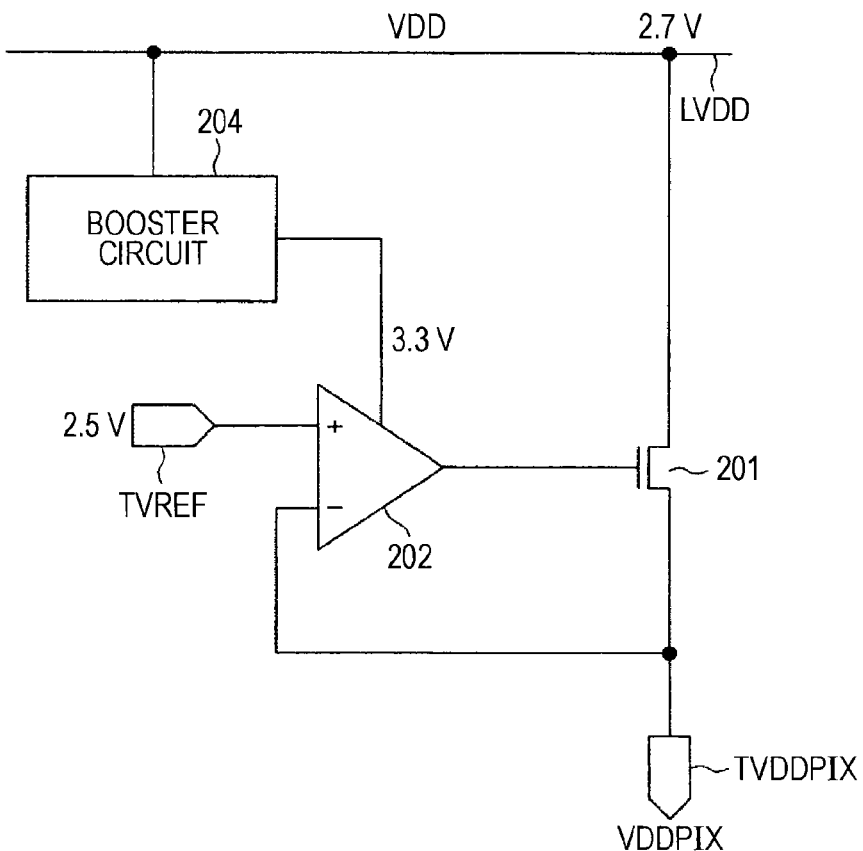
FIG. 13 is a circuit diagram illustrating a sixth example of the configuration of the pixel power supply circuit according to the embodiment.

FIG. 13 is a circuit diagram illustrating a sixth example of the configuration of the pixel power supply circuit according to this embodiment.

A pixel power supply circuit 200E illustrated in FIG. 13 corresponds to the LDO pixel power supply circuit 200 illustrated in FIG. 8, and a booster circuit 204 that increases the gate voltage of the NMOS transistor 201 is provided.

Thus, even when the NMOS transistor is used as a drop transistor, the target voltage of the pixel power supply voltage VDDPIX can be made high by increasing the gate voltage of the NMOS transistor 201.

In this example, the power supply voltage VDD is 2.7 V, the reference voltage VREF is 2.5 V, and the boosted voltage is 3.3 V.

As described above, according to this embodiment, the pixel power supply unit 140 is included that generates the pixel power supply voltage VDDPIX from the supplied power supply voltage VDD and that supplies the generated pixel power supply voltage VDDPIX to the pixel circuits 110A through the power supply line LVDDPIX.

By providing the pixel power supply unit 140, it is possible to generate the pixel power supply voltage VDDPIX having an appropriate value, so that noise is not transmitted to a pixel read signal even if the noise has been superimposed upon the power supply voltage VDD and the transistors that form the pixels do not deteriorate over time.

According to this embodiment, by decreasing the power supply voltage to be supplied to the pixels using the LDO regulators and the MOSFETs, the electric fields generated in the transistors of the pixels are weakened, thereby suppressing deterioration of the characteristics.

The CMOS image sensor according to each example of the embodiment is not particularly limited, but, for example, the CMOS image sensor may be configured as a CMOS image sensor on which a column-parallel ADC is mounted.

Figure 14:
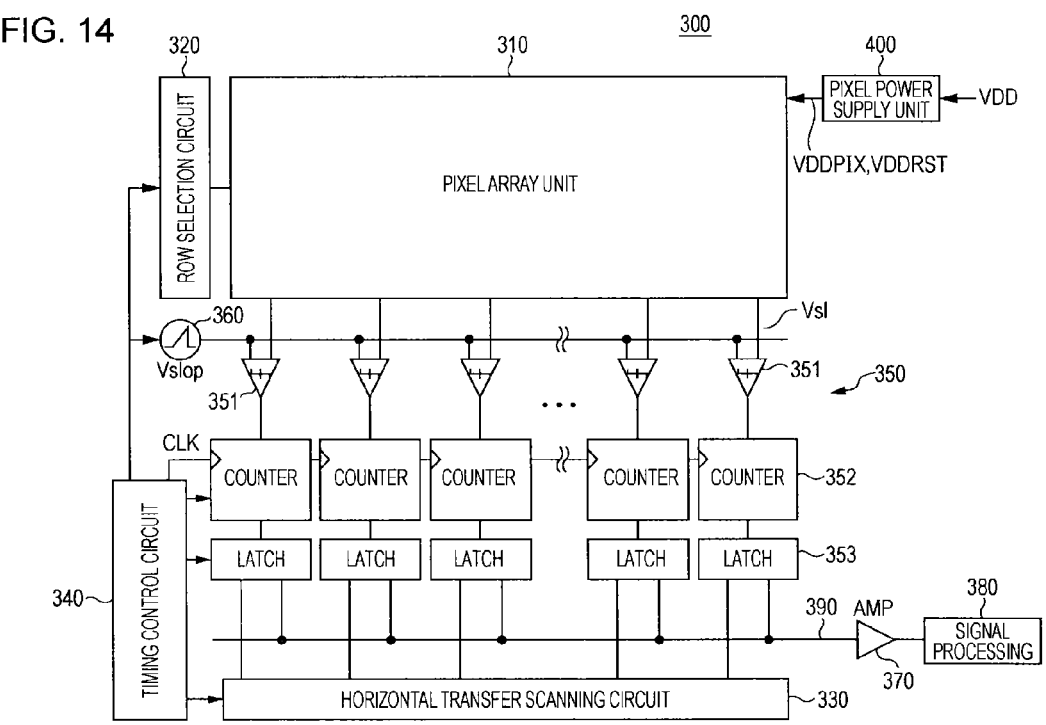
FIG. 14 is a block diagram illustrating an example of the configuration of a column-parallel ADC-mounted solid-state image pickup device (CMOS image sensor) according to the embodiment.

FIG. 14 is a block diagram illustrating an example of the configuration of a column-parallel ADC-mounted solid-state image pickup device (CMOS image sensor) according to the embodiment.

As illustrated in FIG. 14, a solid-state image pickup device 300 includes a pixel array unit 310 as an image pickup unit, a row selection circuit 320 as a pixel driving unit, a horizontal transfer scanning circuit 330, and a timing control circuit 340.

Furthermore, the solid-state image pickup device 300 includes an ADC group 350, a digital-to-analog converter (DAC) 360, amplifier circuits (S/A) 370, a signal processing circuit 380, and horizontal transfer lines 390.

The solid-state image pickup device 300 also includes a pixel power supply unit 400 having the same configuration and function as the above-described pixel power supply unit 140.

Since the pixel power supply unit 400 has been described in detail with reference to FIGS. 1 to 13, further description thereof is omitted herein.

The pixel array unit 310 includes pixels such as, for example, that illustrated in FIG. 5 arranged in a matrix (rows and columns). Each pixel includes a photodiode and a pixel amplifier.

In addition, in the solid-state image pickup device 300, the following circuits are provided as control circuits for sequentially reading signals from the pixel array unit 310.

That is, in the solid-state image pickup device 300, the timing control circuit 340 that generates an internal clock, the row selection circuit 320 that controls row addresses and row scanning, and the horizontal transfer scanning circuit 330 that controls column addresses and column scanning as the control circuits.

In the ADC group 350, a plurality of ADCs each including a comparator 351, a counter 352, and a latch 353 are provided.

The comparator 351 compares reference voltage Vslop, which has a ramp waveform (RAMP) in which reference voltage generated by the DAC 360 changes stepwise, and an analog signal obtained from a pixel in each row through the corresponding vertical signal line.

The counter 352 measures the time taken for the comparator 351 to complete the comparison.

The ADC group 350 has a function of converting an n-bit digital signal and is arranged in units of the vertical signal lines (column lines) to configure column-parallel ADC blocks.

The output of each latch 353 is connected to the horizontal transfer line 390 having, for example, a 2n-bit interval.

The 2n amplifier circuits 370 and signal processing circuits 380 corresponding to the horizontal transfer lines 390 are provided.

In the ADC group 350, an analog signal (potential Vsl) read to the corresponding vertical signal line is compared with the reference voltage Vslop (has a slope waveform in which the voltage changes linearly with a certain inclination) by the comparator 351 provided for each column.

At this time, the counter 352 provided for each column as with the comparator 351 is operating, and the potential Vslop having a ramp waveform and a counter value change while having a one-to-one correspondence with each other, thereby converting the potential (analog signal) Vsl of the vertical signal line into a digital signal.

Changes in the reference voltage Vslop are used to convert changes in voltage into changes in time, and the time is measured using a certain period (clock) and converted into a digital value.

When the analog electric signal Vsl and the reference voltage Vslop have intersected, the output of the comparator 351 is inverted and the input clock of the counter 352 stops, thereby completing the analog-to-digital conversion.

After the completion of the analog-to-digital conversion, the horizontal transfer scanning circuit 330 inputs data held by the latch 353 to the signal processing circuit 380 through the horizontal transfer line 390 and the amplifier circuit 370, and a two-dimensional image is generated.

Thus, a column-parallel output process is performed.

The pixel power supply unit 400 is applied to the pixel power supply unit 140 described with reference to FIGS. 4 to 13.

By providing the pixel power supply unit 400, it is possible to generate the pixel power supply voltage VDDPIX having an appropriate value, so that noise is not transmitted to a pixel read signal even if the noise has been superimposed upon the power supply voltage VDD and the transistors that form the pixels do not deteriorate over time.

By decreasing the power supply voltage to be supplied to the pixels using the LDO regulators and the MOSFETs, the electric fields generated in the transistors of the pixels are weakened, thereby suppressing deterioration of the characteristics.

The effects of proving the pixel power supply unit 400 are significant in, for example, a solid-state image pickup device having the configuration of the pixels that will be described hereinafter.

As described above, the pixel array unit 310 includes a plurality of pixels arranged in a matrix (rows and columns).

Figure 15:
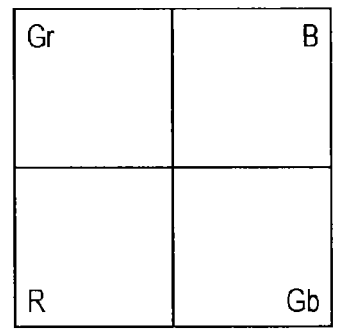
FIG. 15 is a diagram illustrating a Bayer pattern as an example of pixel arrangement.

As the pixel arrangement of the pixel array unit 310, for example, a Bayer pattern illustrated in FIG. 15 is adopted.

In the pixel array unit 310 in this example, for example, a pixel is divided into a plurality of divided pixel cells DPC, each including a photoelectric conversion element formed by a photodiode.

More specifically, in the column-parallel ADC-mounted solid-state image pickup device (CMOS image sensor) 300, a pixel under a color filter having the same color in the Bayer pattern is divided into a plurality of divided pixel cells DPC whose sensitivities or accumulation periods are different from one another.

When a pixel signal is to be subjected to analog-to-digital conversion and output in a column direction, output divided pixel signals of the divided pixel cells are added and subjected to the analog-to-digital conversion. At this time, the input range of the AD converter is clipped in such a way as to be constantly lower than or equal to the saturation output voltage of each pixel, thereby determining the output value of each pixel to be a particular digital value.

In the following description, an example will be described in which a single pixel DPC is divided into four divided pixel cells DPC-A to DPC-D.

Figure 16:
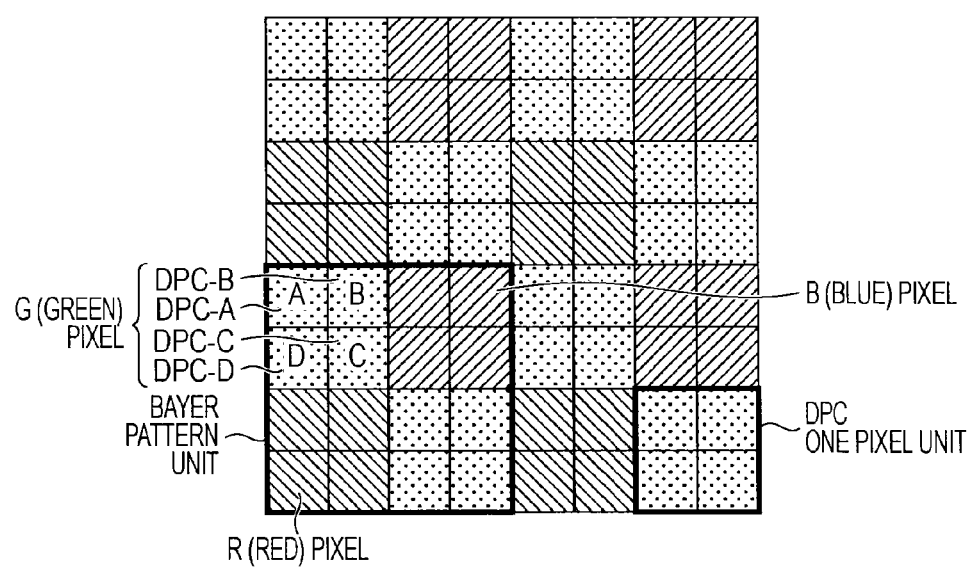
FIG. 16 is a conceptual diagram illustrating pixel division according to the embodiment.

FIG. 16 is a conceptual diagram illustrating pixel division according to the embodiment of the present disclosure.

FIG. 16 illustrates a dividing method in the case of the Bayer pattern and a pixel under a color filter having the same color is divided into quarters. The individual pixels obtained as a result of the division have different sensitivities or accumulation periods.

In FIG. 16, an example is illustrated in which a green (G) pixel PCG is divided into the four pixels DPC-A, DPC-B, DPC-C, and DPC-D.

The configuration of pixels and divided pixels, the division shapes, and the like in this pixel array unit 310 will be described in detail later.

The solid-state image pickup device 300 sequentially transmits, for example, divided pixel signals amplified within the pixel to the vertical signal line, and an AD converter (AD conversion unit) in the ADC group 350 provided in a column pixel signal read unit executes AD conversion.

When executing an AD conversion operation on a second divided pixel signal, the solid-state image pickup device 300 executes the AD conversion operation on the second divided pixel signal by adding a first AD conversion value.

When executing an AD conversion operation on a third divided pixel signal, the solid-state image pickup device 300 executes the AD conversion operation on the third divided pixel signal by adding a second AD conversion value.

When executing an AD conversion operation on a fourth divided pixel signal, the solid-state image pickup device 300 executes the AD conversion operation on the fourth divided pixel signal by adding a third AD conversion value.

The solid-state image pickup device 300 in this example adopts a divided pixel addition method in which the pixel signals of the plurality of divided pixels are sequentially added by the AD converter provided in the column unit in such a manner.

In the ADC group 350, for example, up-count and down-count processes by the counter are sequentially performed the same number of times as the number of divided pixel signals without resetting the counter, thereby realizing the above-described divided pixel addition executed by the AD converter.

Figure 17:
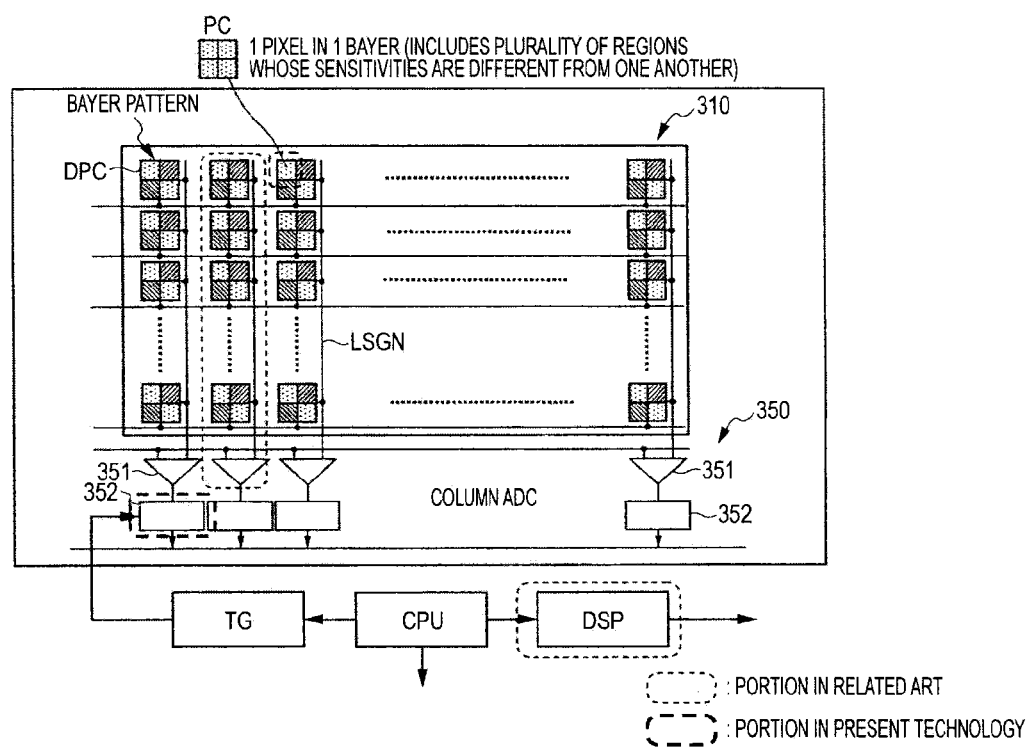
FIG. 17 is a diagram illustrating a section of the column-parallel ADC-mounted solid-state image pickup device (CMOS image sensor) illustrated in FIG. 14 in which an addition process is performed.

FIG. 17 is a diagram illustrating a section of the column-parallel ADC-mounted solid-state image pickup device (CMOS image sensor) illustrated in FIG. 14 in which the addition process is performed.

In FIG. 17, portions surrounded by broken lines can actually execute the addition process. Thin broken lines indicate portions in the related art, and thick broken lines indicate portions according to this embodiment.

A current method for adding the signals of divided pixels is performed by signal processing unit such as a digital signal processor (DSP).

On the other hand, in this embodiment, as described above, the counter 352 sequentially executes the addition process during AD conversion while executing the AD conversion on the pixel signals divided into quarters.

That is, the divided pixel signals amplified within a pixel are sequentially transmitted to the vertical signal line LSGN over time, and the AD converter (AD conversion unit) in the ADC group 350 provided in the column pixel signal read unit executes AD conversion.

When executing an AD conversion operation on a second divided pixel signal, each ADC in the ADC group 350 executes the AD conversion operation on the second divided pixel signal by adding a first AD conversion value.

When executing the AD conversion operation on a third divided pixel signal, each ADC in the ADC group 350 executes the AD conversion operation on the third divided pixel signal by adding a second AD conversion value.

When executing the AD conversion operation on a fourth divided pixel signal, each ADC in the ADC group 350 executes the AD conversion operation on the fourth divided pixel signal by adding a third AD conversion value.

After the elapse of the above AD conversion period, the horizontal transfer scanning circuit 330 transfers data held by the latch 353 to the horizontal transfer line 390, and the data is then input to the signal processing circuit 380 through the amplifier circuit 370, in order to generate a two-dimensional image through certain signal processing.

Various configurations may be adopted for the configuration of the divided pixels, the division shapes, the divided pixel addition process, and the like in this example.

Here, in order to facilitate understanding, an example of the basic configuration of divided pixels in the CMOS image sensor will be described.

Figure 18:
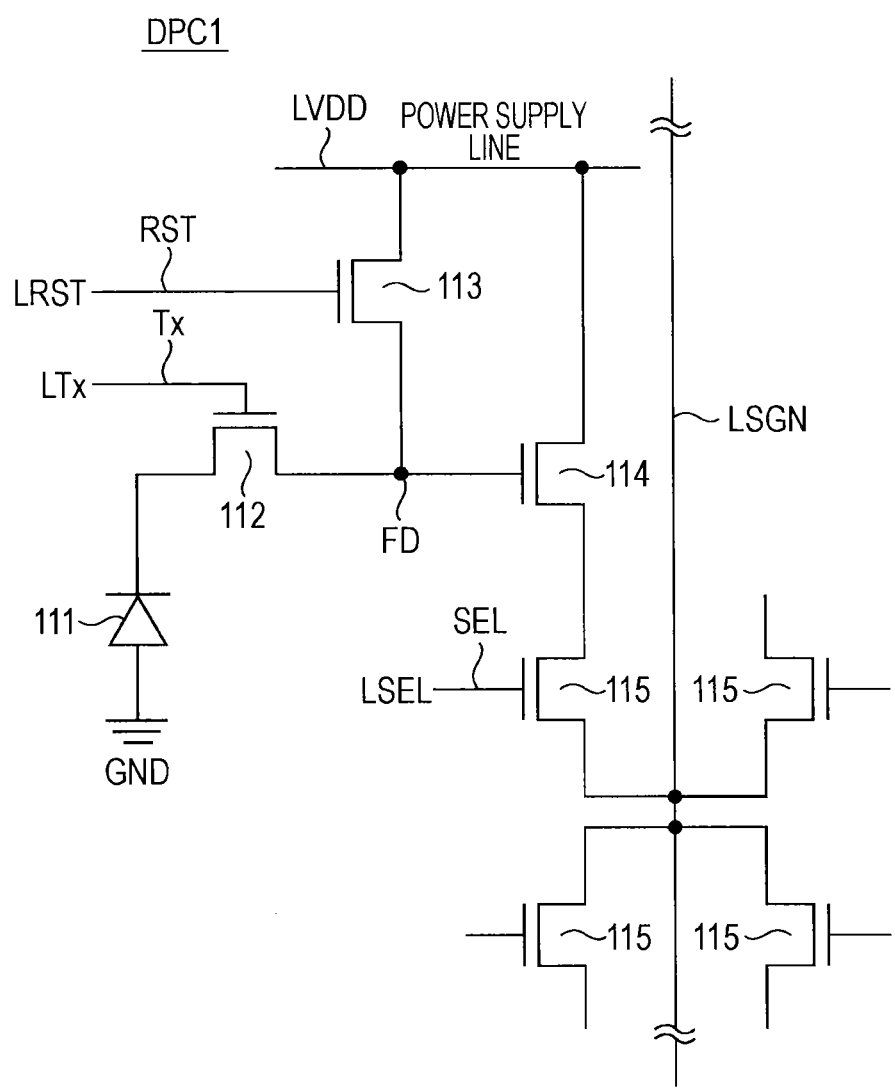
FIG. 18 is a diagram illustrating an example of divided pixels in a CMOS image sensor according to the embodiment including four transistors.

FIG. 18 is a diagram illustrating an example of divided pixels in a CMOS image sensor according to the embodiment including four transistors.

This divided pixel DPC1 has the same configuration as that illustrated in FIG. 5.

The divided pixel DPC1 is connected to a common vertical signal line LSGN through selection transistors 115 of the four divided pixels.

This configuration may be directly applied to the divided pixel cells in this example.

Alternatively, a configuration in which a photoelectric conversion element and a transfer transistor are included in each divided pixel cell and a floating diffusion unit FD is shared by the divided pixel cells may be adopted.

In this case, it is possible to configure an amplifying transistor as an amplifying unit, a selection transistor, and a reset transistor in such a way as to enable sharing.

A solid-state image pickup device having such effects can be applied as an image pickup device in a digital camera or a video camera.

6. Example of Configuration of Camera System

Figure 19:
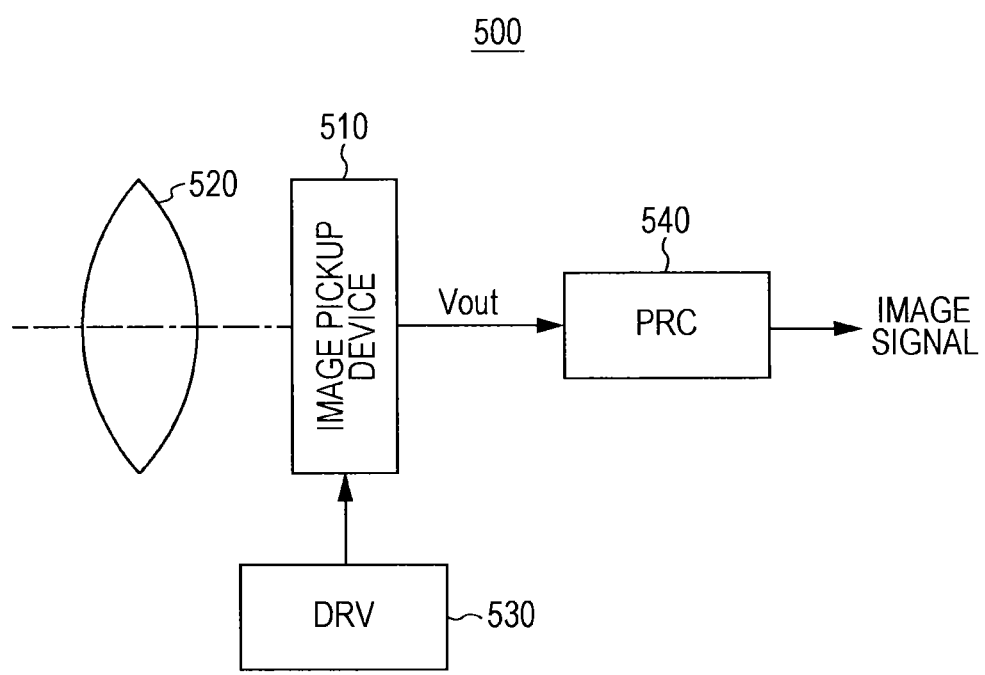
FIG. 19 is a diagram illustrating an example of the configuration of a camera system to which a solid-state image pickup device according to the embodiment of the present technology is applied.

FIG. 19 is a diagram illustrating an example of the configuration of a camera system to which the solid-state image pickup device according to the embodiment of the present technology is applied.

As illustrated in FIG. 19, a camera system 500 includes an image pickup device 510 to which the CMOS image sensor (solid-state image pickup device) 100 or 300 according to the embodiment can be applied.

Furthermore, the camera system 500 includes an optical system that guides incident light (forms the image of a subject) to a pixel region of the image pickup device 510, that is, for example, a lens 520 that forms an image on an image pickup surface using the incident light (image light).

The camera system 500 includes a driving circuit (DRV) 530 that drives the image pickup device 510 and a signal processing circuit (PRC) 540 that processes an output signal of the image pickup device 510.

The driving circuit 530 includes a timing generator (not illustrated) that generates various timing signals including a start pulse for driving circuits inside the image pickup device and a clock pulse, and drives the image pickup device 510 using a certain timing signal.

In addition, the signal processing circuit 540 executes certain signal processing on the output signal of the image pickup device 510.

The image signal processed by the signal processing circuit 540 is recorded on a recording medium such as, for example, a memory. Image information recorded on the recording medium is converted into a hard copy by a printer or the like. In addition, the image signal processed by the signal processing circuit 540 is projected onto a monitor such as a liquid crystal display as a moving image.

As described above, by mounting the above-described image pickup device 100 or 300 on an image pickup apparatus such as a digital still camera as the image pickup device 510, a camera whose power consumption is low and accuracy is high can be realized.

The present technology can have the following configurations.

(1) A solid-state image pickup device including:

a pixel array unit that includes photoelectric conversion elements and in which a plurality of pixels are arranged in rows and columns that output, as pixel signals, electrical signals obtained by photoelectric conversion performed by amplifier elements to which pixel power supply voltage is supplied and that drive signal lines;

a pixel power supply unit that generates the pixel power supply voltage from power supply voltage, the pixel power supply voltage being lower than the power supply voltage, and that supplies the pixel power supply voltage to the amplifier element in each of the pixels; and a pixel signal read unit that reads pixel signals from the plurality of pixels, wherein the pixel power supply unit includes a pixel power supply circuit that generates the pixel power supply voltage having a target voltage while attenuating the power supply voltage such that at least noise superimposed upon the power supply voltage is not transmitted to the pixel signals to be output.

(2) The solid-state image pickup device according to (1), wherein each of the plurality of pixels includes an input node of the amplifier element, a photoelectric conversion element that converts an optical signal into an electrical signal and that accumulates signal electric charge, a transfer element that is turned on or off by a transfer signal and that transfers the electric charge in the photoelectric conversion element to the input node in an on state, and a reset element that is turned on or off by a reset signal and that resets the input node in an on state, wherein the amplifier element and the reset element are connected to a power supply line to which the pixel power supply voltage is supplied, and wherein the reset element resets the input node to a potential of the power supply line.

(3) The solid-state image pickup device according to (1), wherein the pixel power supply unit includes a pixel power supply circuit that generates the pixel power supply voltage from the supplied power supply voltage, the pixel power supply voltage being lower than the power supply voltage, and that outputs the pixel power supply voltage to a first power supply line, and a low-pass filter that generates a reset power supply voltage obtained by extracting low-frequency components from the supplied power supply voltage and that outputs the reset power supply voltage to a second power supply line, wherein each of the plurality of pixels includes
an input node of the amplifier element,
a photoelectric conversion element that converts an optical signal into an electrical signal and that accumulates signal electric charge,
a transfer element that is turned on or off by a transfer signal and that transfers the electric charge in the photoelectric conversion element to the input node in an on state, and
a reset element that is turned on or off by a reset signal and that resets the input node in an on state,
wherein the amplifier element is connected to the first power supply line, and
wherein the reset element is connected to the second power supply line and that resets the input node to the potential of the second power supply line.

(4) The solid-state image pickup device according to any of (1) to (3),
wherein the pixel power supply circuit includes a drop field-effect transistor whose input terminal is connected to a power supply line to which the power supply voltage is supplied and whose output terminal is connected to a power supply line to which the pixel power supply voltage is output and that generates the pixel power supply voltage from the supplied power supply voltage by controlling gate voltage of the drop field-effect transistor in such a way as to be a certain voltage, the pixel power supply voltage being lower than the power supply voltage.

(5) The solid-state image pickup device according to (4),
wherein the pixel power supply circuit includes an operational amplifier that compares reference voltage and the pixel power supply voltage to be output to control the gate voltage of the drop field-effect transistor.

(6) The solid-state image pickup device according to (5),
wherein the pixel power supply circuit includes a booster circuit that increases the gate voltage of the drop field-effect transistor.

(7) The solid-state image pickup device according to (4),
wherein the pixel power supply circuit includes
a resistor element connected between a gate of the drop field-effect transistor and the power supply line to which the power supply voltage is supplied, and
a capacitor connected between the gate of the drop field-effect transistor and reference potential.

(8) The solid-state image pickup device according to (7),
wherein the pixel power supply circuit further includes a resistor element connected between the gate of the drop field-effect transistor and reference potential.

(9). The solid-state image pickup device according to (4),
wherein the pixel power supply circuit includes
a switch connected between a gate of the drop field-effect transistor and the power supply line to which the power supply voltage is supplied, and
a capacitor connected between the gate of the drop field-effect transistor and reference potential, and
wherein the pixel power supply circuit has a function of sampling and holding the gate voltage of the drop field-effect transistor.

(10) The solid-state image pickup device according to (9),
wherein the pixel signal read unit includes an analog-to-digital converter that executes analog-to-digital conversion on the pixel signals read from the pixel array unit, and
wherein the switch in the pixel power supply circuit is controlled in such a way as to be open during the analog-to-digital conversion and closed during periods other than the analog-to-digital conversion.

(11) The solid-state image pickup device according to any of (1) to (10),
wherein the pixel signal read unit includes an analog-to-digital converter that executes analog-to-digital conversion on the pixel signals read from the pixel array unit,
wherein one of the plurality of pixels in the pixel array unit includes a plurality of divided pixels that have been divided into regions whose optical sensitivities or amounts of electric charge accumulated are different from one another,
wherein the pixel signal read unit reads a divided pixel signal of each of the divided pixels of the one of the plurality of pixels, and
wherein the analog-to-digital converter obtains a pixel signal of the one of the plurality of pixels by executing the analog-to-digital conversion on the read divided pixel signals and adding the read divided pixel signals.

(12) A camera system including:
a solid-state image pickup device; and
an optical system that forms an image on the solid-state image pickup device,
wherein the solid-state image pickup device includes
a pixel array unit that includes photoelectric conversion elements and in which a plurality of pixels are arranged in rows and columns that output, as pixel signals, electrical signals obtained by photoelectric conversion performed by amplifier elements to which pixel power supply voltage is supplied and that drive signal lines,
a pixel power supply unit that generates the pixel power supply voltage from power supply voltage, the pixel power supply voltage being lower than the power supply voltage, and that supplies the pixel power supply voltage to the amplifier element in each of the pixels, and
a pixel signal read unit that reads pixel signals from the plurality of pixels, and
wherein the pixel power supply unit includes a pixel power supply circuit that generates the pixel power supply voltage having a target voltage while attenuating the power supply voltage such that at least noise superimposed upon the power supply voltage is not transmitted to the pixel signals to be output.

The present disclosure contains subject matter related to that disclosed in Japanese Priority Patent Application JP 2011-198706 filed in the Japan Patent Office on Sep. 12, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A solid-state image pickup device comprising:
a pixel array unit that includes photoelectric conversion elements and in which a plurality of pixels are arranged in rows and columns that output, as pixel signals, electrical signals obtained by photoelectric conversion performed by amplifier elements to which pixel power supply voltage is supplied and that drive signal lines;
a pixel power supply unit that generates the pixel power supply voltage from power supply voltage, the pixel power supply voltage being lower than the power supply voltage, and that supplies the pixel power supply voltage to the amplifier elements in the plurality of pixels; and
a pixel signal read unit that reads pixel signals from the plurality of pixels,
wherein the pixel power supply unit includes a pixel power supply circuit that generates the pixel power supply volt- age having a target voltage while attenuating the power supply voltage such that at least noise superimposed upon the power supply voltage is not transmitted to the pixel signals to be output.

2. The solid-state image pickup device according to claim 1,
wherein each of the plurality of pixels includes
an input node of the amplifier element,
a photoelectric conversion element that converts an optical signal into an electrical signal and that accumulates signal electric charge,
a transfer element that is turned on or off by a transfer signal and that transfers the electric charge in the photoelectric conversion element to the input node in an on state, and
a reset element that is turned on or off by a reset signal and that resets the input node in an on state,
wherein the amplifier element and the reset element are connected to a power supply line to which the pixel power supply voltage is supplied, and
wherein the reset element resets the input node to a potential of the power supply line.

3. The solid-state image pickup device according to claim 1,
wherein the pixel power supply unit includes
a pixel power supply circuit that generates the pixel power supply voltage from the supplied power supply voltage, the pixel power supply voltage being lower than the power supply voltage, and that outputs the pixel power supply voltage to a first power supply line, and
a low-pass filter that generates reset power supply voltage obtained by extracting low-frequency components from the supplied power supply voltage and that outputs the reset power supply voltage to a second power supply line,
wherein each of the plurality of pixels includes
an input node of the amplifier element,
a photoelectric conversion element that converts an optical signal into an electrical signal and that accumulates signal electric charge,
a transfer element that is turned on or off by a transfer signal and that transfers the electric charge in the photoelectric conversion element to the input node in an on state, and
a reset element that is turned on or off by a reset signal and that resets the input node in an on state,
wherein the amplifier element is connected to the first power supply line, and
wherein the reset element is connected to the second power supply line and that resets the input node to the potential of the second power supply line.

4. The solid-state image pickup device according to claim 1,
wherein the pixel power supply circuit includes a drop field-effect transistor whose input terminal is connected to a power supply line to which the power supply voltage is supplied and whose output terminal is connected to a power supply line to which the pixel power supply voltage is output, and
wherein the pixel power supply circuit that generates the pixel power supply voltage from the supplied power supply voltage by controlling gate voltage of the drop field-effect transistor in such a way as to be a certain voltage, the pixel power supply voltage being lower than the power supply voltage.

5. The solid-state image pickup device according to claim 4,
wherein the pixel power supply circuit includes an operational amplifier that compares reference voltage and the pixel power supply voltage to be output to control the gate voltage of the drop field-effect transistor.

6. The solid-state image pickup device according to claim 5,
wherein the pixel power supply circuit includes a booster circuit that increases the gate voltage of the drop field-effect transistor.

7. The solid-state image pickup device according to claim 4,
wherein the pixel power supply circuit includes
a resistor element connected between a gate of the drop field-effect transistor and the power supply line to which the power supply voltage is supplied, and
a capacitor connected between the gate of the drop field-effect transistor and reference potential.

8. The solid-state image pickup device according to claim 7,
wherein the pixel power supply circuit further includes a resistor element connected between the gate of the drop field-effect transistor and the reference potential.

9. The solid-state image pickup device according to claim 4,
wherein the pixel power supply circuit includes
a switch connected between a gate of the drop field-effect transistor and the power supply line to which the power supply voltage is supplied, and
a capacitor connected between the gate of the drop field-effect transistor and reference potential, and
wherein the pixel power supply circuit has a function of sampling and holding the gate voltage of the drop field-effect transistor.

10. The solid-state image pickup device according to claim 9,
wherein the pixel signal read unit includes an analog-to-digital converter that executes analog-to-digital conversion on the pixel signals read from the pixel array unit, and
wherein the switch in the pixel power supply circuit is controlled in such a way as to be open during the analog-to-digital conversion and closed during periods other than the analog-to-digital conversion.

11. The solid-state image pickup device according to claim 1,
wherein the pixel signal read unit includes an analog-to-digital converter that executes analog-to-digital conversion on the pixel signals read from the pixel array unit,
wherein one of the plurality of pixels in the pixel array unit includes a plurality of divided pixels that have been divided into regions whose optical sensitivities or amounts of electric charge accumulated are different from one another,
wherein the pixel signal read unit reads a divided pixel signal of each of the divided pixels of the one of the plurality of pixels, and
wherein the analog-to-digital converter obtains a pixel signal of the one of the plurality of pixels by executing the analog-to-digital conversion on the read divided pixel signals and adding the read divided pixel signals.

12. A camera system comprising:
a solid-state image pickup device; and
an optical system that forms an image of a subject on the solid-state image pickup device,
wherein the solid-state image pickup device includes a pixel array unit that includes photoelectric conversion elements and in which a plurality of pixels are arranged in rows and columns that output, as pixel signals, electrical signals obtained by photoelectric conversion performed by amplifier elements to which pixel power supply voltage is supplied and that drive signal lines, a pixel power supply unit that generates the pixel power supply voltage from power supply voltage, the pixel power supply voltage being lower than the power supply voltage, and that supplies the pixel power supply voltage to the amplifier elements in the plurality of pixels, and a pixel signal read unit that reads pixel signals from the plurality of pixels, and wherein the pixel power supply unit includes a pixel power supply circuit that generates the pixel power supply voltage having a target voltage while attenuating the power supply voltage such that at least noise superimposed upon the power supply voltage is not transmitted to the pixel signals to be output.

* * * * *